(12) United States Patent
Wehling

(10) Patent No.: US 6,693,580 B1
(45) Date of Patent: Feb. 17, 2004

(54) MULTIFUNCTION MILLIMETER-WAVE SYSTEM FOR RADAR, COMMUNICATIONS, IFF AND SURVEILLANCE

(75) Inventor: John H. Wehling, Manhattan Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/235,029

(22) Filed: Sep. 4, 2002

(51) Int. Cl.[7] .............................. G01S 13/78; G01S 7/42
(52) U.S. Cl. .................................. 342/45; 20/57; 20/62
(58) Field of Search .............................. 342/13, 20, 45, 342/57–59, 62, 194, 195, 196, 357.06, 357.17

(56) References Cited

U.S. PATENT DOCUMENTS

| | | | | |
|---|---|---|---|---|
| 3,858,206 A | * | 12/1974 | Scheidler et al. | 342/83 |
| 5,117,360 A | * | 5/1992 | Hotz et al. | 342/195 |
| 5,892,478 A | * | 4/1999 | Moss | 342/149 |
| 6,053,736 A | * | 4/2000 | Huffman et al. | 434/11 |
| 6,081,222 A | * | 6/2000 | Henkel et al. | 342/45 |
| 6,133,871 A | * | 10/2000 | Krasner | 342/357.06 |
| 6,204,800 B1 | * | 3/2001 | Neumann | 342/25 |
| 6,249,589 B1 | * | 6/2001 | Hoch | 382/103 |
| 6,420,995 B1 | * | 7/2002 | Richmond et al. | 342/45 |
| 2001/0006372 A1 | * | 7/2001 | Lemelson et al. | 342/45 |

* cited by examiner

Primary Examiner—Thomas H. Tarcza
Assistant Examiner—Isam Alsomiri
(74) Attorney, Agent, or Firm—John A. Miller; Warn, Burgess & Hoffmann, P.C.

(57) ABSTRACT

A multifunction millimeter-wave system (10) that provides simultaneous and prioritized active radar protection and surveillance, high digital data rate communications, interceptor missile guidance, passive surveillance and IFF interrogation for a military vehicle. The system (10) includes a multi-function control computer (14) that provides high level control functions. The system (10) also includes a plurality of azimuth sector sub-systems (12), each including a steerable antenna (26) that directs a millimeter-wave beam to a particular location within the area covered by the sector sub-system (12). Each sector sub-system (12) also includes an FPGA-based modem (20) that performs digital signal processing for the various system operations, such as signal modulation and demodulation. Each sector sub-system (12) also includes an IF/RF transceiver (22), including a direct digital synthesizer (24), for providing signal tuning and frequency up-conversion and down-conversion.

25 Claims, 1 Drawing Sheet

Figure 1:
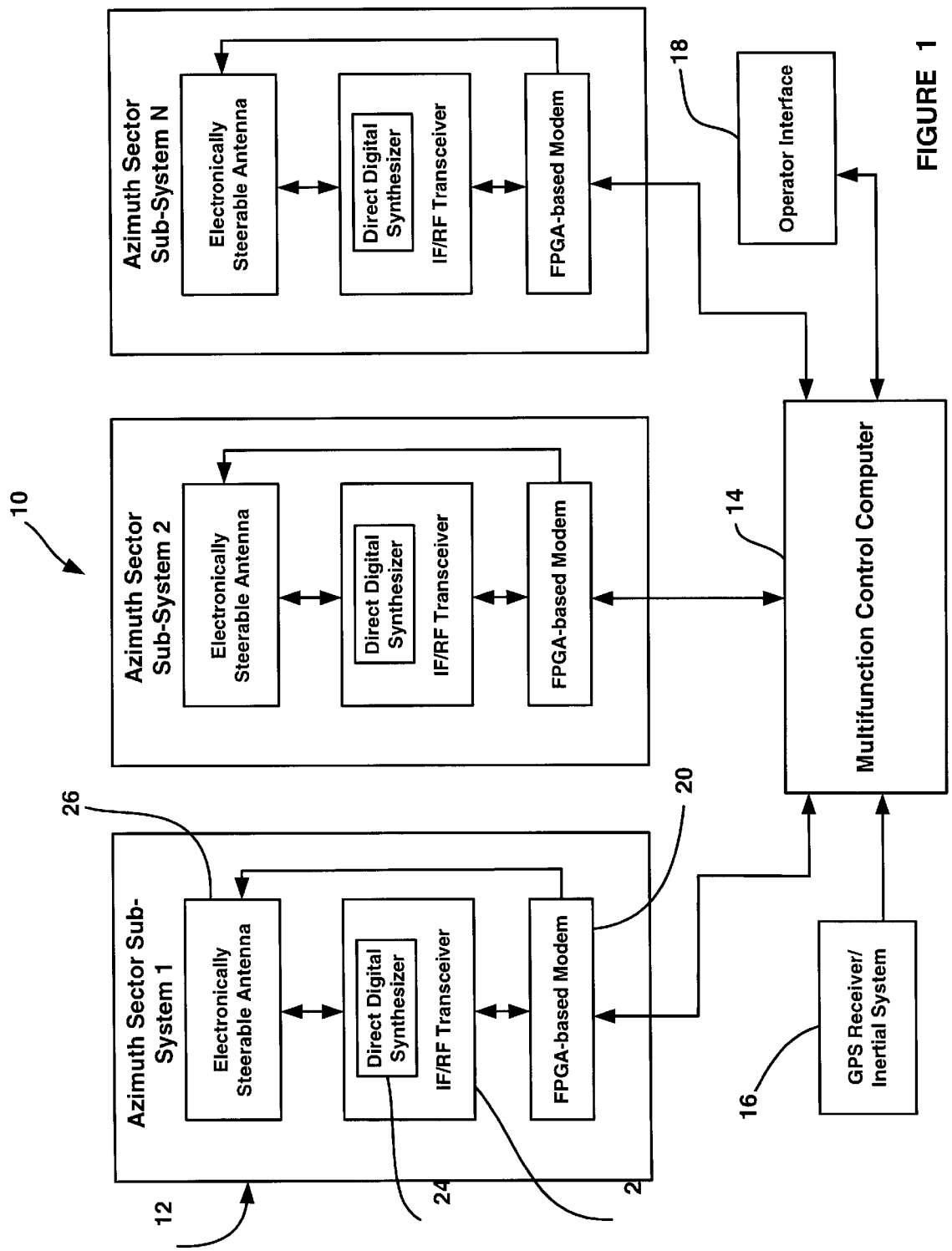

MULTIFUNCTION MILLIMETER-WAVE SYSTEM FOR RADAR, COMMUNICATIONS, IFF AND SURVEILLANCE

BACKGROUND OF THE INVENTION

1. Field of the Invention

This invention relates generally to a multifunction millimeter-wave system and, more particularly, to a multifunction millimeter-wave system that provides simultaneous and prioritized high data rate digital communications, active protection including radar tracking and surveillance, interceptor missile guidance, passive surveillance and identification friend-or-foe (IFF) interrogation for a military vehicle.

2. Discussion of the Related Art

Communications, detection, radar and imaging systems that operate using millimeter-wave radiation (30–300 GHz) provide significant advantages over other types of related systems that operate using visible light, infrared radiation and other electro-optical radiation. These advantages generally include the fact that millimeter-wave radiation can penetrate low visibility and obscured atmospheric conditions caused by many factors, such as clouds, fog, haze, rain, dust, smoke, sandstorms, etc., without severe attenuation, as would occur with other types of radiation. Particularly, millimeter-wave radiation around 35 GHz is minimally attenuated by oxygen and water vapor in the air.

Millimeter-wave radiation is also effective in passing through certain hard substances, such as wood. Also, because millimeter-wave systems operate at high frequency, the antenna apertures and other system hardware can be made very small. Thus, millimeter-wave systems are desirable for many applications, such as aircraft landing systems, collision avoidance systems, detection and tracking systems, surveillance systems, etc.

Because of the advantages discussed above, millimeter-wave systems are desirable for many military applications. The advantages of millimeter-wave systems for military applications can be summarized as providing small high gain antennas, good weather penetration, anti-jam capabilities, low probability of interception, low probability of detection, and wide-band operations.

Modern battlefield vehicles, such as armored vehicles, tanks and Humvees, employ highly sophisticated millimeter-wave systems for both offensive and defensive applications. For example, it is known to employ millimeter-wave radar detection systems providing 360° radar beams for surveillance purposes to detect airborne threats, and radar beams to track direct fire threats based on optical sensor detections of gun flashes and plumes. Millimeter-wave guidance systems are known to direct or guide an interceptor missile to "take out" a direct fire or airborne threat. It is also known to employ millimeter-wave identification friend-or-foe (IFF) interrogation systems to interrogate a battlefield party to determine whether he is friendly. In such systems, a coded millimeter-wave signal is transmitted to a party in the battlefield. If the appropriate signal is returned, then the transmitting party knows the interrogated party is friendly. Millimeter-wave communications systems are also used to transmit high rate digital data, such as video and multiple voice channels between parties. These communication systems enable mobile ad hoc networking.

The above described millimeter-wave systems have been employed on military vehicles, where each system addresses only a single function. Thus, the available real estate on the vehicle is quickly used up and the cost of all of the systems combined is great.

SUMMARY OF THE INVENTION

In accordance with the teachings of the present invention, a multifunction millimeter-wave system is disclosed. The multifunction system provides simultaneously two or more of the following functions: (1) high data rate communications including ad hoc networking; (2) active protection radar/guidance for point defense against direct fire and overhead threats; (3) active radar surveillance not related to point defense; (4) interceptor missile guidance not related to point defense; (5) IFF interrogation for a military vehicle; and (6) passive surveillance to sense millimeter-wave radiation.

The system includes a GPS receiver for identifying the position of the vehicle and a multifunction control computer that provides high level control functions for the system. The system also includes a plurality of sector sub-systems, such as three sector sub-systems each covering 120°. Each subsystem includes a steerable antenna that directs a millimeter-wave beam to a particular location within the area covered by the sector sub-system. Each sector sub-system also includes an FPGA-based modem that performs digital signal processing for the various system operations, such as signal modulation and demodulation. Each sector sub-system also includes an IF/RF transceiver, including a direct digital synthesizer, for providing signal tuning and frequency up-conversion and down-conversion. An alternate, lower cost, lower capability system can use a single FPGA-based modem and multiple steerable antennas. The modem switches to one array antenna at a time, while the other array antennas are inactive.

Each sector sub-system provides the various beams for each of radar surveillance, high data rate communications, active radar protection and surveillance, interceptor missile guidance, passive surveillance and IFF interrogation. The various functions are prioritized by the control computer, and can all be performed simultaneously based on the prioritization and time sharing.

BRIEF DESCRIPTION OF THE INVENTION

FIG. 1 is a block diagram of a multifunction millimeter-wave system that provides simultaneous and prioritized radar surveillance, high data rate digital communications, active radar protection, interceptor missile guidance, passive surveillance and IFF interrogation for a military vehicle, according to an embodiment of the present invention.

DETAILED DESCRIPTION OF THE EMBODIMENTS

The following discussion of the present invention directed to a multifunction millimeter-wave system that simultaneously provides several millimeter-wave applications, including, but not limited to, high data rate digital communications including ad hoc networking, radar surveillance and active protection, passive surveillance, interceptor missile guidance and identification friend-or-foe interrogation, is merely exemplary in nature, and is in no way intended to limit the invention or its, applications or uses. For example, the multifunction system described herein has particular application for an armored military vehicle, but can be used in other military vehicles, and can possibly have commercial applications.

FIG. 1 is a block diagram of a multifunction millimeter-wave system 10 that provides a plurality of millimeter-wave functions, according to an embodiment of the present invention. As will be discussed in detail below, the system 10 can provide simultaneous and prioritized millimeter-wave operations necessary in a modern battlefield, and can be used in connection with a military vehicle, such as an armored vehicle. According to the invention, all of the operations would be performed in a common wide millimeter-wave band, such as 35–38 GHz for weather penetration purposes, where each separate operation is in a sub-band within that wide bandwidth.

The various millimeter-wave functions provided by the system 10 include, but are not limited to, providing a 360° search radar beam for airborne and ground threats, providing high data rate (100 Mbps) digital communications, including mobile ad hoc networking, video transmission, multiple voice channels, etc., active radar protection for tracking direct fire threats based on optical sensor detections of gun flashes or plumes, active radar protection for search, detection and tracking of airborne threats, providing interceptor missile guidance for incoming threats, providing passive surveillance and providing IFF interrogation to determine whether a party is a friend or foe. Each of these operations is known in the art in a military environment in separate millimeter-wave systems. Applicant's invention is a multi-function system that is able to perform all of these operations, where several or all of the operations can be performed at once, and are prioritized based on known criteria.

The system 10 includes a plurality of azimuth sector sub-systems 12 which provide highly directed millimeter-wave beams for both transmission and reception purposes for a predetermined section of the battlefield. Typically, each azimuth sector sub-system 12 covers a 90°–120° azimuth sector of the 360° target area around the vehicle. Each sector sub-system 12 also covers the range from the horizon to the zenith. The system 10 includes three separate azimuth sector sub-systems 12, where each sector sub-system 12 would cover 120° in azimuth. However, other multifunction millimeter-wave systems can employ other number of azimuth sector sub-systems covering more or less of the target area within the scope of the present invention. Also, a sector sub-system can cover a different amount of the target area than other sector sub-systems in the system 10. Each sub-system 12 provides all of the separate functions discussed herein. As will be discussed below, each of the separate functions is prioritized on a sector-by-sector basis and are time shared between the three sector sub-systems 12.

By providing several separate sector sub-systems 12, the multiple operations can be performed simultaneously where each separate sub-system 12 could be performing a different function at the same time, and where the various operations would be time shared between the sector sub-systems 12 to provide the complete coverage. For example, when one of the sector sub-systems 12 is in the process of performing its part of a 360° radar scan beam, the other sector sub-systems 12 can be performing other operations, such as digital data transmission, IFF interrogation, etc. Operations such as passive surveillance where the system 10 passively receives millimeter-wave radiation from the environment can be performed when any of the other more important operations are not being performed. The operation being performed by a particular sub-system 12 at any given time would be on the order of 1 millisecond per operation.

The system 10 includes a multifunction control computer 14 that provides the high level control functions for all of the azimuth sector sub-systems 12. The system 10 includes an operator interface 18 that provides operator control of the control computer 14. The control computer 14 can be any digital computer suitable for the purposes described herein.

The control computer 14 is programmed to perform the operations discussed herein, as would be well understood to those skilled in the art. The control computer 14 receives positional information from a GPS receiver 16 so that the system 10 knows the location of the vehicle for purposes that are clear from this discussion. For example, it is necessary to specifically know where the system 10 is located, and to know where another party is located, to define the size of the beam transmitted by a sector sub-system 12. A wide transmission beam can be used in a hand-shaking low data rate application to determine where another party is located, and then a switch is made to high data rate at a narrow beam. If the GPS receiver 16 is being jammed or blocked, the receiver 16 includes an inertial system that provides the location of the vehicle based on the last known vehicle position from the GPS receiver.

As will be discussed herein, the control computer 14 provides high-level control functions including selecting which one of the sector sub-systems 12 will currently perform which function, providing time-sharing and switching of the functions between the various sector sub-systems 12, providing antenna beam steering, signal modulation, digital data rate, communication modes, high level direct digital synthesizer (DDS) control, network and router functions, security functions, such as communications routing protocol, encryption, IFF functions, high level control of radar, radar modes, surveillance functions, carrier frequency control, Kalman filtering, and interfacing with other vehicle computers and devices, such as the operator interface 18. The control computer 14 also provides buffered digital communication data to the particular sector sub-system 12 for communications purposes.

A field programmable gate array (FPGA) based modem 20 in each sector sub-system 12 receives the control and digital data signals from the control computer 14 and performs the digital processing. In particular, the modem 20 provides the detailed digital signal processing to perform the particular operation as selected by the control computer 14. The modem 20 generates the particular waveform that is to be transmitted by the sector sub-system 12 for the particular operation commanded by the control computer 14. The modem 20 receives the digital information from the control computer 14 and converts it to a suitable modulated waveform such as an in-phase and quadrature-phase modulated waveform.

The FPGA modem 20 enables an accurate timing relationship between demodulation of incoming waveforms and modulation of outgoing waveforms. Precise timing is essential in active protection against high speed threats. Specifically, precise timing is essential between the radar tracking signal and the interceptor guidance command signal.

The modem 20 is a digital logic device that performs a multitude of high speed operations for processing digital data with high precision timing. The modem 20 can be any modem suitable for the purposes described herein, such as an FPGA modem, that can be programmed for the particular operations discussed herein. The modem 20 provides modulation of transmitted signals and demodulation of received signals, tracking functions, including phase locked loops, delay locked loops and detailed antenna timing control, fast Fourier Transform (FFT) analysis, constant false alarm rate thresholding for radar, error correction, DDS control for frequency hop and wideband frequency modulated waveforms.

In the transmit mode, the modem 20 converts the digital signal being processed to an analog signal by a digital-to-analog converter (not shown) in the modem 20. The converted analog signal from the modem 20 is applied to an IF/RF transceiver 22 as a base-band signal modulated in-phase and quadrature-phase. The transceiver 22 provides up-converting of the signal to be transmitted to the millimeter-wave frequency sub-band for that particular function. The transceiver 22 also provides the desired filtering and amplification processes as would be common in a communications system.

The transceiver 22 also includes a wideband (approximately 3 GHz) direct digital synthesizer 24 that provides signal tuning to the particular millimeter-wave frequency sub-band for that particular operation. The direct digital synthesizer 24 synthesizes frequency and phase modulation waveforms that are beyond the capability of the modem 20. For example, certain radar waveforms employ linear frequency modulation in an analog format that cannot be performed by the modem 20. The direct digital synthesizer 24 can perform linear frequency modulated radar waveforms necessary for precision radar tracking. The modem 20 controls the direct digital synthesizer 24 to tell it when to switch to the particular sub-band tuning for a particular operation. The transceiver 22 also receives DDS control for modulation and timing from the modem 20.

The up-converted RF signal, including DDS tuning modulation, is sent to an electronically steerable antenna 26 to be transmitted to a particular location in the azimuth sector defined by that particular sub-system sector 12. The electronic steerable antenna 26 can be any phased array antenna suitable for the purposes described herein that can quickly switch directional control of the signal to any location defined by that particular sector sub-system 12 and for any desired beamwidth. It may be possible for some current or future phased array antennas to provide simultaneous beams in two or more directions. In that embodiment, the sector sub-system 12 could generate beams for two or more different operations at two or more different millimeter-wave sub-bands. Also, the system can perform two or more operations at two or more different sub-bands for a beam directed to a single direction. The modem 20 also provides a beam steering control, including angle and switch timing, to the steerable antenna 26. In other words, the modem 20 defines the area in the sub-sector that the steerable antenna 26 is to direct its beam.

In the receive mode, the steerable antenna 26 directs its beam to a desired location in the azimuth sector defined by that sector sub-system 12 to receive signals. The received signals are sent to the transceiver 22 to be down-converted to a lower frequency and amplified, as is well understood in the art. The down-converted signal is sent to the modem 20 where it is converted to a digital signal by an analog-to-digital converter (not shown). The modem 20 performs the demodulation and various other operations on the down-converted digital signal for the particular function being detected, as discussed herein, and provides the processed digital signal to the control computer 14 for operation.

In an alternate embodiment, a single FPGA-modem can control all of the separate sub-systems. In this embodiment, the modem would switch to one array antenna at a time, and the other antennas would be inactive.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A multifunction millimeter-wave system comprising:
   a plurality of azimuth sector sub-systems, each sector sub-system including an antenna and a transceiver; and
   a multifunction control computer for providing control functions for each azimuth sector sub-system, wherein the control computer controls and prioritizes multiple operations being simultaneously performed by the system, including high data communications functions and radar surveillance functions, where two different sector sub-systems perform different operations at the same time, and wherein each operation is performed in a millimeter-wave frequency band.

2. The system according to claim 1 wherein the control computer also provides control functions and prioritized operations for active radar protection to detect direct fire threats for each sector sub-system.

3. The system according to claim 1 wherein the control computer also provides control functions and prioritized operations for interceptor missile guidance for each sector sub-system.

4. The system according to claim 1 wherein the control computer also provides control functions and prioritized operations for identification friend-or-foe interrogation for each sector sub-system.

5. The system according to claim 1 wherein the control computer also provides control functions and prioritized operations for a passive surveillance function for each sector sub-system.

6. The system according to claim 1 wherein the high data rate communications functions also include ad hoc networking.

7. The system according to claim 1 wherein each azimuth sector sub-system includes a modem.

8. The system according to claim 7 wherein the modem is an FPGA-based modem that provides digital signal processing.

9. The system according to claim 1 wherein the transceiver includes a direct digital synthesizer, said direct digital synthesizer providing signal tuning for the millimeter-wave beam.

10. The system according to claim 1 wherein the antenna is an electronically steerable phased antenna array.

11. The system according to claim 1 further comprising an FPGA-modem for controlling all of the sub-systems.

12. The system according to claim 1 further comprising a GPS receiver, said GPS receiver providing location signals to the control computer.

13. The system according to claim 1 wherein the plurality of azimuth sector sub-systems is three sector sub-systems, where each sector sub-system covers 120°.

14. The system according to claim 1 wherein the control computer provides control functions for network router functions, security functions, encryption, high level control radar, surveillance functions, modulation selection, carrier frequency control functions, sector control functions, Kalman filtering, and interface with other devices.

15. A multifunction millimeter-wave system comprising:
   at least three azimuth sector sub-systems, each azimuth sector sub-system including an electronically steerable antenna for steering an antenna beam to any location within a sector defined by that sub-system, a transceiver for providing frequency up-conversion and down-conversion, and an FPGA based modem for providing digital signal processing; and a multifunction control computer for providing control functions for each azimuth sector sub-system, wherein the control computer controls and prioritizes multiple millimeter-wave operations being performed by the system, including high-data rate digital communications functions including ad hoc networking, active radar protection and surveillance functions, passive surveillance functions, interceptor missile guidance functions and identification friend-or-foe interrogation functions, where two different sub-systems perform different millimeter-wave operations at the same time.

16. The system according to claim 15 wherein the transceiver includes a direct digital synthesizer, said direct digital synthesizer providing signal tuning for the antenna beam.

17. The system according to claim 15 further comprising a GPS receiver, said GPS receiver providing location signals to the control computer.

18. The system according to claim 15 wherein the electronically steerable antenna is a phased antenna array.

19. The system according to claim 15 wherein the control computer provides control functions for network router functions, security functions, encryption, high level control radar, surveillance functions, modulation selection, carrier frequency control functions, sector control functions, Kalman filtering, and interface with other devices.

20. The system according to claim 15 wherein each operation performed by the system is in a millimeter-wave sub-band centered at 35 GHz.

21. A method of performing a plurality of millimeter-wave operations, comprising:

providing a plurality of azimuth sector sub-systems where each sub-system covers a predetermined part of a 360° target area, each azimuth sector sub-system including an electronically steerable antenna for steering a millimeter-wave antenna beam to any location within the sector covered by that sub-system, a transceiver for providing frequency up-conversion and down-conversion, and an FPGA based modem for providing digital signal processing;

simultaneously performing more than one of the millimeter-wave operations, where two different sub-systems perform different millimeter-wave operations at the same time; and prioritizing the plurality of millimeter-wave operations for each sector sub-system.

22. The method according to claim 21 wherein the millimeter-wave operations include more than one of high data rate digital communications, active radar protection, radar surveillance, interceptor missile guidance, passive surveillance and identification friend-or-foe interrogation.

23. The method according to claim 21 wherein the transceiver includes a direct digital synthesizer providing signal tuning for the antenna beam.

24. The method according to claim 21 wherein the electronically steerable antenna is a phased antenna array.

25. The method according to claim 21 wherein providing a plurality of azimuth sector sub-systems includes providing three azimuth sectors sub-systems each covering 120° of the target area.

* * * * *